United States Patent [19]

Tanaka et al.

[11] Patent Number: 5,659,337

[45] Date of Patent: Aug. 19, 1997

[54] MESSAGE DISPLAY SYSTEM FOR PROGRAMMABLE CONTROLLER

[75] Inventors: Kunio Tanaka, Akishima; Yoshiharu Saiki, Minamitsuru-gun, both of Japan

[73] Assignee: Fanuc Ltd., Japan

[21] Appl. No.: 50,087

[22] PCT Filed: Sep. 11, 1992

[86] PCT No.: PCT/JP92/01172

§ 371 Date: Apr. 28, 1993

§ 102(e) Date: Apr. 28, 1993

[87] PCT Pub. No.: WO93/06536

PCT Pub. Date: Apr. 1, 1993

[30] Foreign Application Priority Data

Sep. 19, 1991 [JP] Japan ................... 3-239706

[51] Int. Cl.$^6$ ................................. G09G 5/00
[52] U.S. Cl. .................... 345/200; 345/185; 395/758
[58] Field of Search ........................ 345/142, 157, 345/123, 186, 185, 192, 193, 187, 189, 190, 200, 201, 203; 434/157; 341/28; 400/109, 111, 484; 364/419.16

[56] References Cited

U.S. PATENT DOCUMENTS

| | | | |
|---|---|---|---|
| 4,365,315 | 12/1982 | Jamnik | 364/419.16 |
| 4,731,735 | 3/1988 | Borgendale et al. | 364/419.16 |
| 4,779,080 | 10/1988 | Coughlin et al. | 345/157 |
| 4,791,587 | 12/1988 | Doi | 434/157 |
| 4,940,970 | 7/1990 | Fujisaku | 345/123 |
| 5,056,145 | 10/1991 | Yamamoto et al. | 434/157 |
| 5,091,876 | 2/1992 | Kumano et al. | 434/157 |
| 5,181,014 | 1/1993 | Dalrymple et al. | 345/186 |

FOREIGN PATENT DOCUMENTS

| | | |
|---|---|---|
| 0 047 414 | 3/1982 | European Pat. Off. . |
| 0 217 174 | 4/1987 | European Pat. Off. . |
| 0376 741 | 7/1990 | European Pat. Off. . |
| 0 431 730 | 6/1991 | European Pat. Off. . |
| 62-81103 | 5/1987 | Japan . |
| 62-125402 | 6/1987 | Japan . |
| 62-172444 | 7/1987 | Japan . |
| 64-76326 | 3/1989 | Japan . |
| 01 150 170 | 6/1989 | Japan . |
| 90 12358 | 10/1990 | WIPO . |

*Primary Examiner*—Curtis Kuntz
*Assistant Examiner*—Vivian W. Chang
*Attorney, Agent, or Firm*—Staas & Halsey

[57] ABSTRACT

A message display system for a programmable controller having a function for displaying a message in different languages and an improved program processing efficiency. A message storing means for a plurality of languages includes a plurality of storing areas (1a–1c) for storing messages in the different languages. In the respective languages storing areas (1a–1c), messages having the same meaning in the different languages are stored in addresses having a sequence corresponding to one another. When a power is supplied to the PC, a message transfer means (3) transfers a message of a single language previously designated by a parameter (2) from the message storing means (1) for a plurality of languages to a message storing means (4) for a single language. Then, a message selection means (5) designates a message desired to be displayed on a display screen when the PC is in operation by an address determined to correspond to the meaning of each message, and a message display means (6) fetches the message at the designated address from the message storing means (4) for a single language and displays the same on the display screen of a display unit (7).

4 Claims, 9 Drawing Sheets

MESSAGE DISPLAY SYSTEM FOR PROGRAMMABLE CONTROLLER

BACKGROUND OF THE INVENTION

1. Field of the Invention

The present invention relates to a message display system for a programmable controller (PC) for displaying messages on a display screen while the PC is in operation, and more specifically, to a message display system for a PC having a function to display a message for each language.

2. Description of the Related Art

Conventionally, a message display system for a PC has a function for displaying a message for each language. This system is arranged such that an area for storing each language is provided in a ROM contained in the PC and when the PC is put into operation, a language designated on a sequence program is fetched from the ROM to display a message. As a result, even if a PC is shipped to a region using a different language, it is not necessary to design a different sequence program corresponding to the language used in the region.

Figure 9:
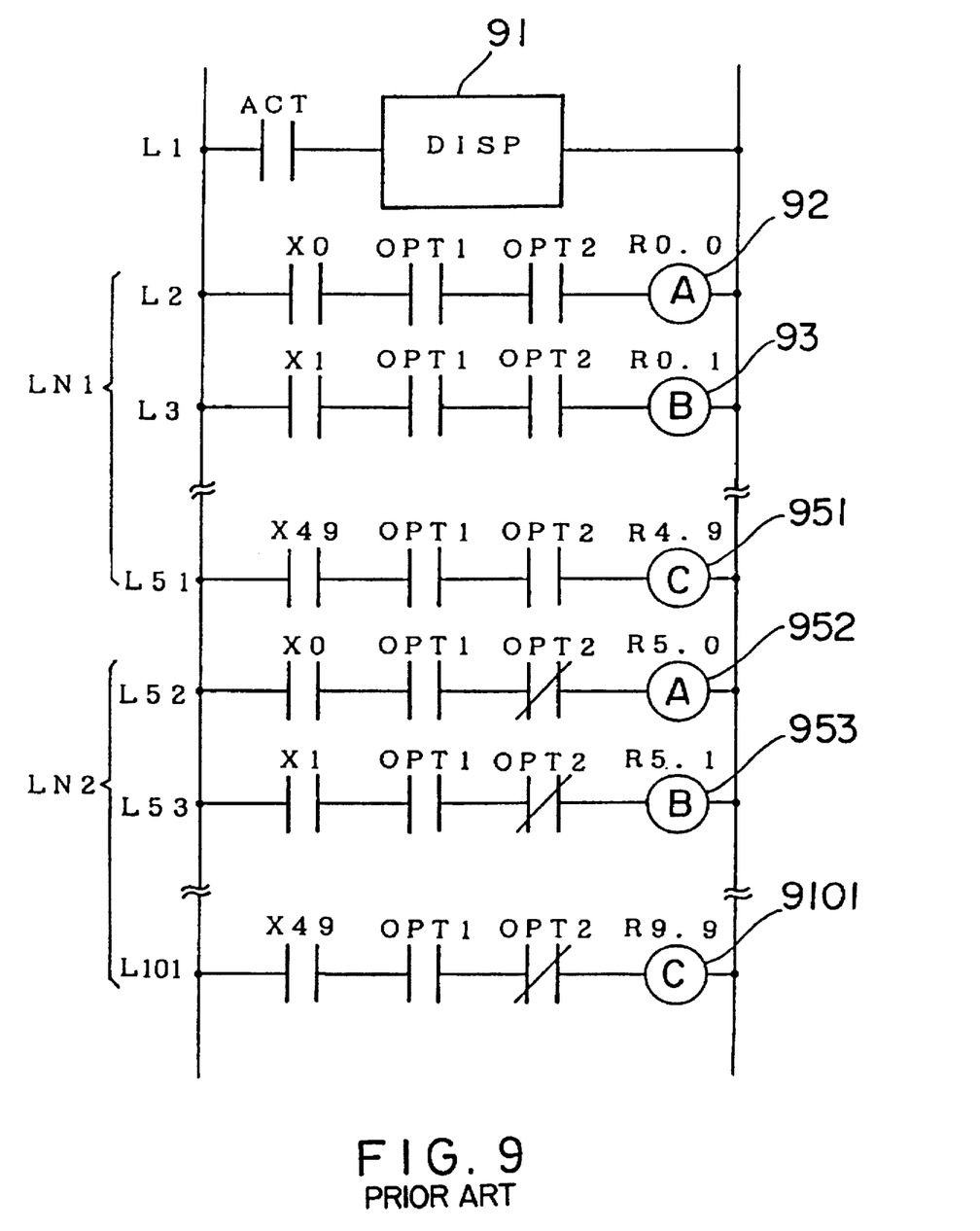
FIG. 9 (Prior Art) is a diagram showing an example of a ladder program according to a conventional message display system for a PC.

FIG. 9 (Prior Art) is a diagram showing an example of a ladder program according to a conventional PC message display system. A net L1 includes a message display command (DISP) 91 as a function command. Nets L2–L51 are a net group LN1 for a Japanese message and nets L52–L101 are a net group LN2 for an English message. Further, net groups for a German message and French message are also provided in addition to the above net groups. It is assumed, however, that only the net group LN1 for the Japanese message and the net group LN2 for the English message are programmed to simplify the description.

In the ladder program shown in FIG. 9, when a contact ACT is turned ON, a message display command (DISP) 91 is executed. As a result, a message corresponding to the address of the coil turned ON of coils 92–9101 are displayed. The messages included in the coils 92–951 for Japanese messages have meanings sequentially corresponding to the meanings of the messages included in the coils 952–9101 for English messages. For example, if a message displayed when the coil 92 is turned ON is "MACHIGAI", in Japanese which means error, a message displayed when the coil 952 is turned ON is "ERROR" in English.

As shown by the relationship between the coils 92 and 952, coils corresponding to a message of the same meaning in Japanese and English share a common contact. More specifically, the coils 92 and 952 share a contact X0, the coils 95 and 953 share a contact X1, and further the coils 951 and 9101 share a contact X49.

In addition, contacts OPT1 and OPT2 are connected to all the nets L2–L101. These contacts OPT1 and OPT2 are set to a contact a by a sequence program in the net group LN1 for the Japanese message, whereas the contacts OPT1 are set to the contact a and the contacts OPT2 are set to a contact b in the net group LN2 for the English message. A state of signals input to these contacts OPT1 and OPT2 is preset by parameters by an operator. Note specifically, when a message is desired to be displayed in Japanese, a state of signals input to the contacts OPT1 and OPT2 is set to an ON state, whereas when the message is desired to be displayed in EngLish, a state of signals input to the contact OPT1 is set to an ON state and a state of signals input to the contact OPT2 is set to an OFF state.

Thus, when any one of the contacts X0–X49 is turned ON, the coil on the net are turned ON. When a parameter is set to display the Japanese message and the contact X0, for example, is turned ON, the coil 92 on the net L2 is turned ON. As a result, a message corresponding to the address R0.0 of the coil 92, i.e., "MACHIGAI" is displayed on a screen, whereas when the parameter is set to display the EngLish message and the contact X0 is turned ON, the coil 952 on the net L52 is turned ON. As a result, a message corresponding to the address R5.0 of the coil 952, i.e., "ERROR" is displayed on the screen.

Nevertheless, since the aforesaid conventional message display system includes the coils corresponding to unnecessary other languages in the ladder program, a program processing executed for these coils is very wasteful.

SUMMARY OF THE INVENTION

Taking the above into consideration, an object of the present invention is to provide a message display system for a PC by which a program can be effectively processed while a message is displayed in a plurality of languages.

To attain the above object, according to the present invention, there is provided a message display system for a programmable controller (PC) for displaying a message on a display screen while the PC is in operation, which comprises a message storing means for a plurality of languages including a plurality of languages storing areas for storing the messages in different languages in which messages having the same meaning in the different languages are stored in addresses having a sequence corresponding to one another; a message storing means for a single language to which only a message of a single language is transferred from the message storing means for a plurality of languages; a message transfer means for transferring the message of the single language previously designated by a parameter from the message storing means for a plurality of languages to the message storing means for a single language when a power is supplied; a message selection means for designating a message desired to be displayed on the display screen while the PC is in operation by an address determined to correspond to the meaning of each message; and a message display means for fetching the message at the address designated by the message selection means from the message storing means for a single language and displaying the same on the display screen.

When power is supplied, a message of a single language previously designated by a parameter is transferred from the message storing means for a plurality of languages to the message storing means of a single language. Then, an address corresponding to a message desired to be displayed while the PC is in operation is designated by the message selection means and the message display means fetches the message at the designated address from the message storing means for a single language and displays the same on the display screen.

DETAILED DESCRIPTION OF THE PREFERRED EMBODIMENTS

Embodiments of the present invention will be described below with reference to the drawings.

Figure 1:
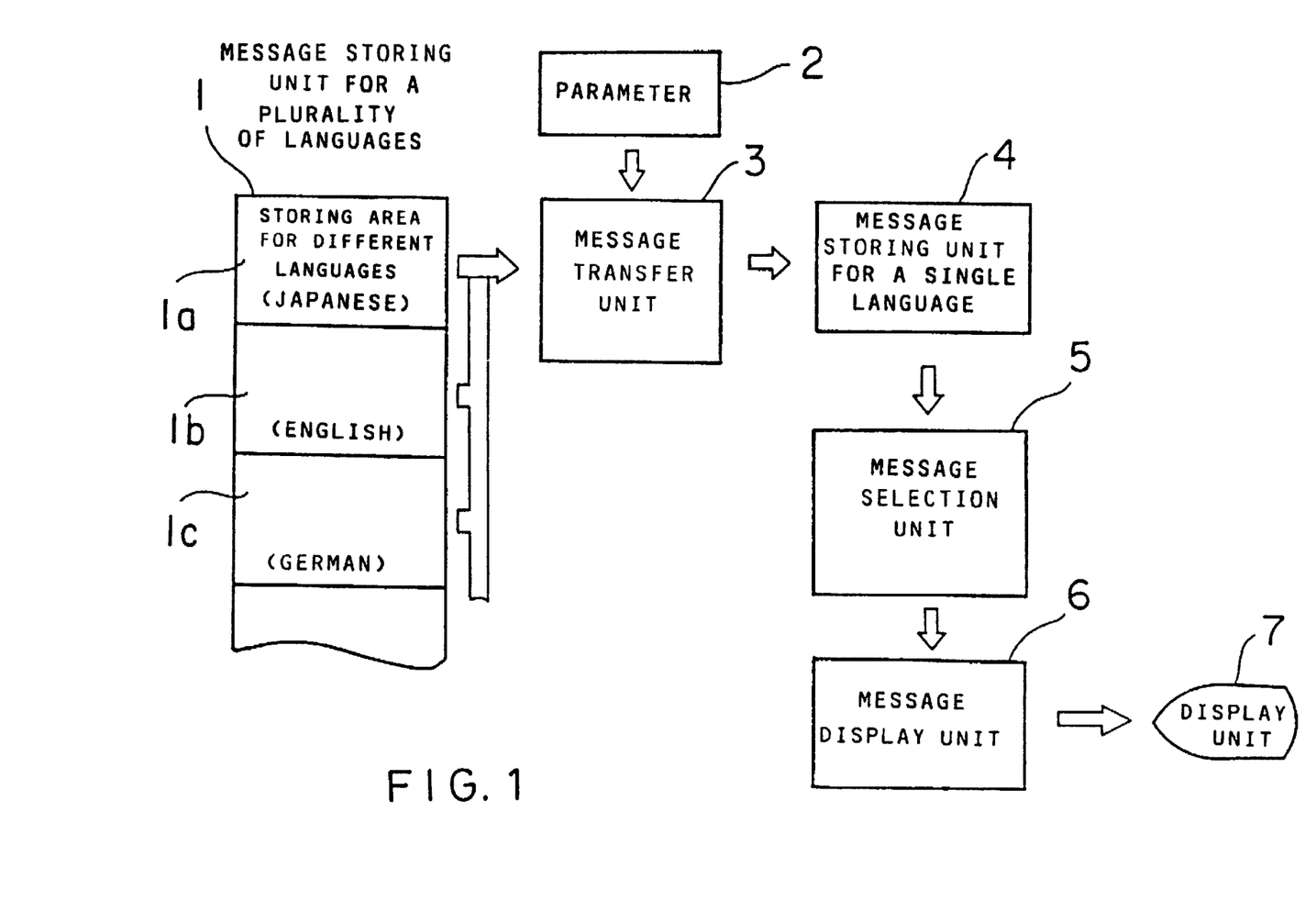
FIG. 1 is a conceptual diagram of the present invention.

FIG. 1 is a conceptual diagram of the present invention. A message storing unit 1 for a plurality of languages includes a plurality of storing areas 1a–1c for storing messages in the different languages. In the respective languages storing areas 1a–1c, messages having the same meaning in the different languages are stored in addresses having a sequence corresponding to one another. When a power is supplied to the PC, a message transfer unit 3 transfers a message of a single language previously designated by a parameter 2 from the message storing unit 1 for a plurality of languages to a message storing unit 4 for a single language. Then, a message selection unit 5 designates a message desired to be displayed on a display screen when the PC is in operation by an address determined to correspond to the meaning of each message, and a message display unit 6 fetches the message at the designated address from the message storing unit 4 for a single language and displays the same on the display screen of a display unit 7.

Figure 2:
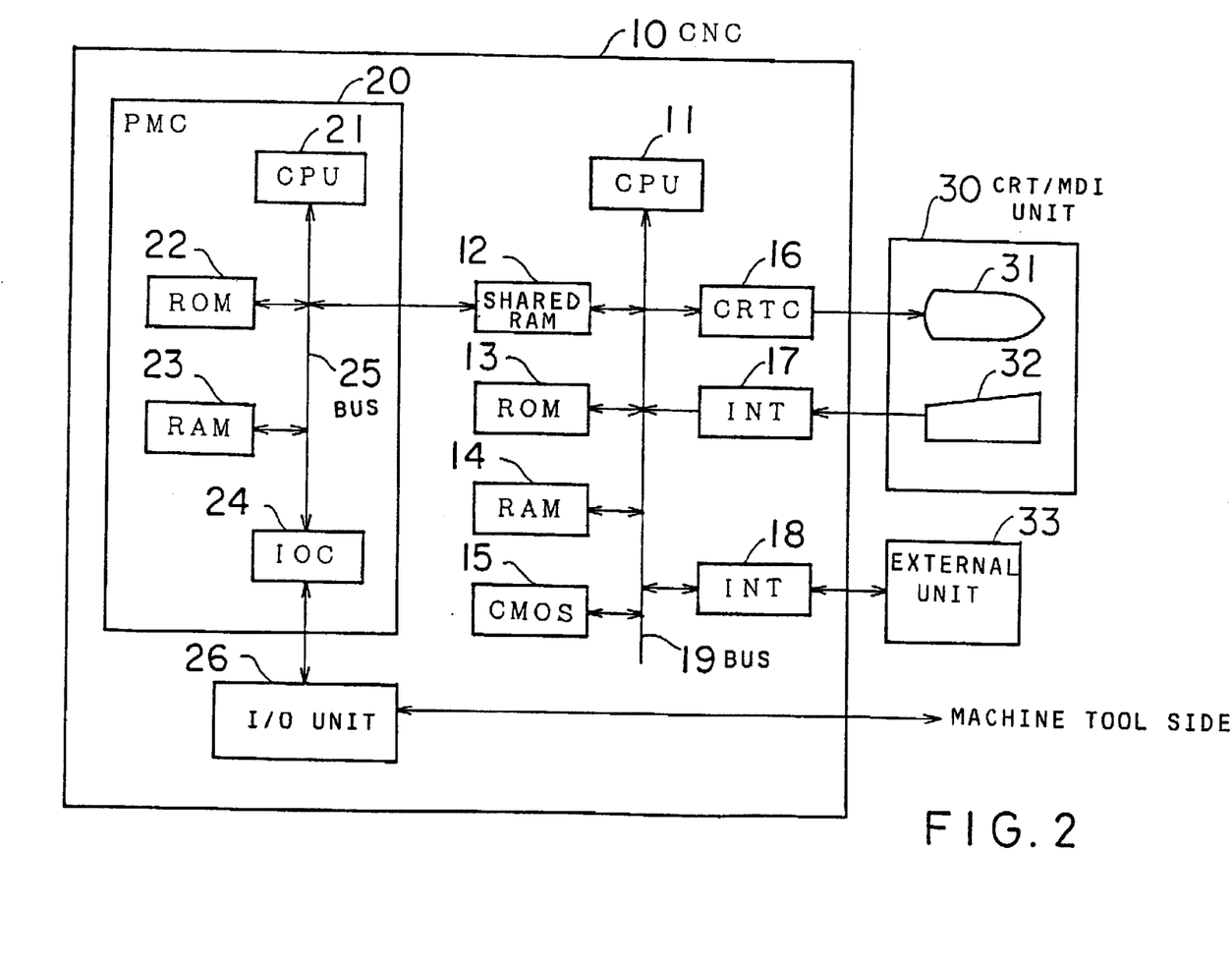
FIG. 2 is a block diagram of the entire hardware of a numerical control apparatus embodying the present invention.

FIG. 2 is a block diagram of the hardware of a numerical control apparatus as a whole embodying the present invention. A programmable machine controller (PMC) 20 as the PC is incorporated in the numerical control apparatus (CNC) 10, and a processor 11, which controls the CNC 10 as a whole, reads out a system program stored in a ROM 13, through a bus 19, and controls the entire CNC 10 in accordance with the system program.

A shared RAM 12 enables the CNC 10 to transfer or receive data to or from the PMC 20, and thus CNC 10 and PMC 20 transfer data to each other through the shared RAM 12. Further, the shared RAM 12 stores data needed to allow a simultaneous access by the CNC 10 and the PMC 20.

A RAM 14 stores temporary calculation data, display data, and the like. A CMOS 15 is composed of a non-volatile memory which stores amounts of tool correction, amounts of pitch error correction, machining programs, parameters, and the like, and these data are maintained even after a power supply to the CNC 10 is cut off, because the CMOS 15 is supplied with power from a not shown battery and is a non-volatile memory. Further, the CMOS 15 also stores parameters and the like needed by the PMC 20.

A graphic control circuit 16 converts digital data such as the present condition of each axis, an alarm, parameters, image data, and the like into image signals and outputs the same to the display unit 31 of a CRT/MDI unit 30, to be displayed thereon. The parameters, ladder diagrams and the like of the PMC 20 can be also displayed on the display unit 31. Data at this time are transferred from the PMC 20 through the shared RAM 12.

An interface 17 receives data from the keyboard 32 in the CRT/MDI unit 30 and supplies the same to the processor 11. Further, data to the PMC 20 can be input through the keyboard 32 and supplied to the PMC 20 through the shared RAM 12.

An interface 18 for external units is connected to an external unit 33 such as a paper tape reader, paper tape puncher, paper tape reader/puncher, printer, and the like, and a machining program can be read from the paper tape reader, and a machining program edited in the numerical control apparatus (CNC) 10 can be output to the paper tape puncher.

The processor 11 is connected to the elements such as the shared RAN 12, ROM 13, and the like through the bus 19.

Note, an axis control circuit for controlling servo motors and the like, a servo amplifier, a spindle control circuit, a spindle amplifier, an interface for a manual pulse generator and the like are not shown in the figure.

The programmable machine controller (PMC) 20 is provided with a processor 21 for processing the PMC, which is connected to the shared RAM 12 through a bus 25, and the shared RAM 12 is connected to the bus 19 of the CNC 10.

A ROM 22 is connected to the bus 25, and stores a management program for controlling the PMC 20 and a sequence program. Although the sequence program is generally created by the use of a ladder language, it is sometimes created by a high-level language such as a PASCAL or the like. Further, the ROM 22 stores messages to be displayed on the screen when necessary while the PMC 20 is in operation. Note, sometimes, a ROM cassette interface is provided in place of the ROM 22, and a ROM cassette storing the sequence program is connected to the ROM cassette interface. With this arrangement, the sequence program can be easily upgraded and changed.

Further, a RAM 23 is connected to the bus 25 and stores an I/O signal, and the content thereof is rewritten as the sequence program is executed. Further, when a power is supplied to the PMC 20, a group of messages to be described below is transferred from the ROM 22 to the RAM 23.

An I/O control circuit 24 is connected to the bus 25, converts an output signal stored in the RAM 23 to a serial signal, and transfers the same to an I/O unit 26. Further, the I/O control circuits 24 converts a serial input signal from the I/O unit 26 to a parallel signal and transfers the same to the bus 25. The signal is stored in the RAM 23 by the processor 21.

The processor 21 receives command signals such as an M function signal, T function signal and the like from the CNC 10 through the shared RAM 12. These command signals are temporarily stored in the RAM 23, processed according to the sequence program stored in the ROM 22, and then output to the I/O unit 26 through the I/O control circuit 24. These output signals control hydraulic units, pneumatic units, and magnetic units of a machine tool.

Further, the processor 21 receives input signals such as a limit switch signal, a signal from an operation switch on a machine control panel, and the like, from the machine tool, and temporarily stores these signals in the RAM 23. Input signals not required to be processed by the PMC 20 are transferred to the processor 11 through the shared RAM 12; other signals are processed by the sequence program and a part thereof are output to the CNC, and the remaining signals are output as an output signal from the I/O unit 26 to the machine tool through the I/O control circuit 24.

Further, the sequence program can include commands for controlling the movement and the like of each axis, and when read by the processor 21, these commands are transferred to the processor 11 through the shared RAM 12, to control the servo motors. The spindle motors and the like may be similarly controlled by commands from the PMC.

Furthermore, the sequence program stored in the ROM 22, and the I/O signals stored in the RAN 23, may be displayed on the display unit 31 of the CRT/MDI unit 30.

Also, the sequence program of the RON 22 may be output to the printer connected to the interface 18, through the shared RAN 12 and bus 19.

Further, a program creation device may be connected to the interface 18, a sequence program and the like created by the program creation device may be transferred to the RAN 23, and the PMC 20 may be operated by the sequence program in the RAN 23.

Figure 3:
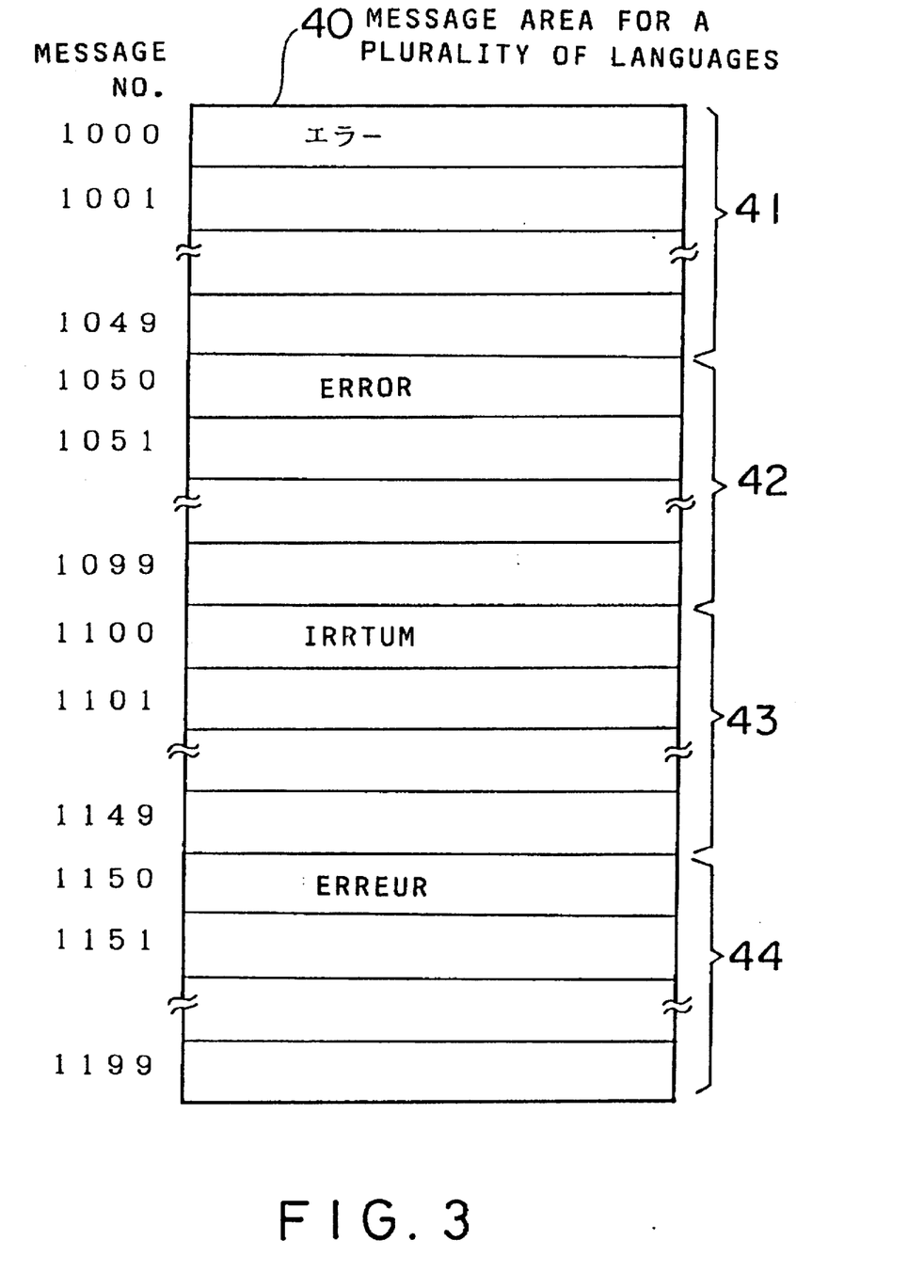
FIG. 3 is a conceptual diagram of a message areas for a plurality of languages.

Next, the message display system of the PMC 20 arranged as described above will be described. FIG. 3 is a conceptual diagram of a message area 40 stored in the ROM 22 for messages for a plurality of languages. The message area 40 for the messages for the plurality of languages is composed of message areas 41–44 for four languages of, for example, Japanese, English, German and French. Each of the message areas 41–44 stores fifty messages, respectively. More specifically, Japanese messages are stored in message numbers 1000–1049; English messages are stored in message numbers 1050–1099; German messages are stored in message numbers 1100–1149; and French messages are stored in message numbers 1150–1199.

Further, messages each having the same meaning in the different languages are stored in the respective message areas in the same sequence. That is, when the message stored at the leading message number 1000 of the Japanese message area 41 is "MACHIGAI", "ERROR" (English) "IRR-TUM" (German) and "ERREUM" (French), which has the same meaning as MACHIGAI in Japanese, are stored at the respective leading message numbers 1050, 1100 and 1150 of the other message areas 42, 43 and 44.

Figure 4:
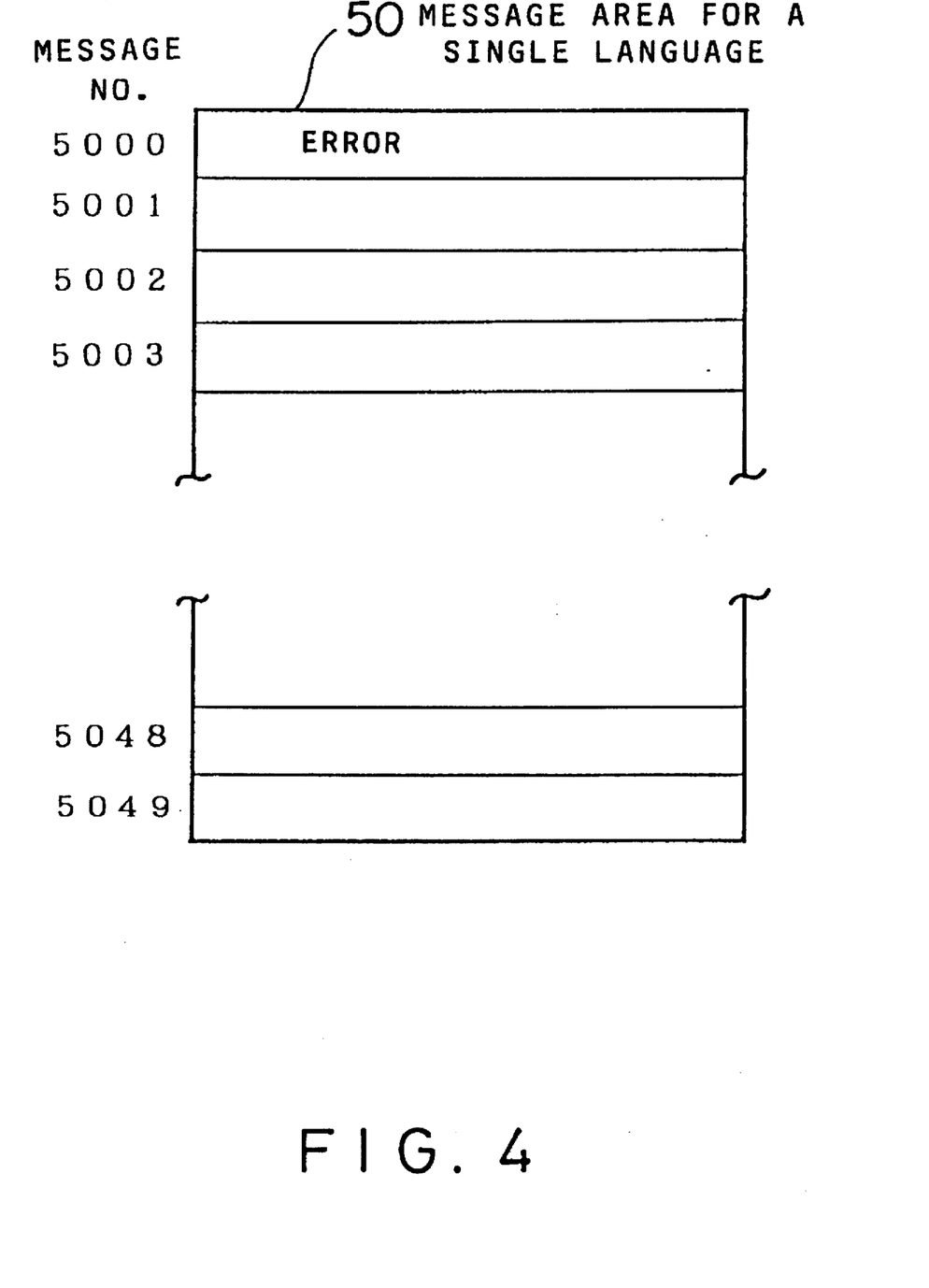
FIG. 4 is a conceptual diagram of a message area for a single language.

When power is supplied to the PMC 20, only one message area is selected from these message areas 41–44 and transferred to a message area for a single language. The language of the message to be transferred is selected by a preset parameter stored in the CMOS 15 of the CNC 10. FIG. 4 is a conceptual diagram of the message area 50 for a single language in the RAM 23. Messages are transferred to and stored in message numbers 5000–5049 in the same order as that in the respective message areas of the message area 40 for a plurality of languages. It is assumed here that messages from the Japanese message area 41 are transferred to the message area 50 for a single language. Therefore, the messages at the message numbers 1000–1049 of the message area 41 are stored at the message numbers 5000–5049, respectively, in a corresponding relationship.

Figure 5:
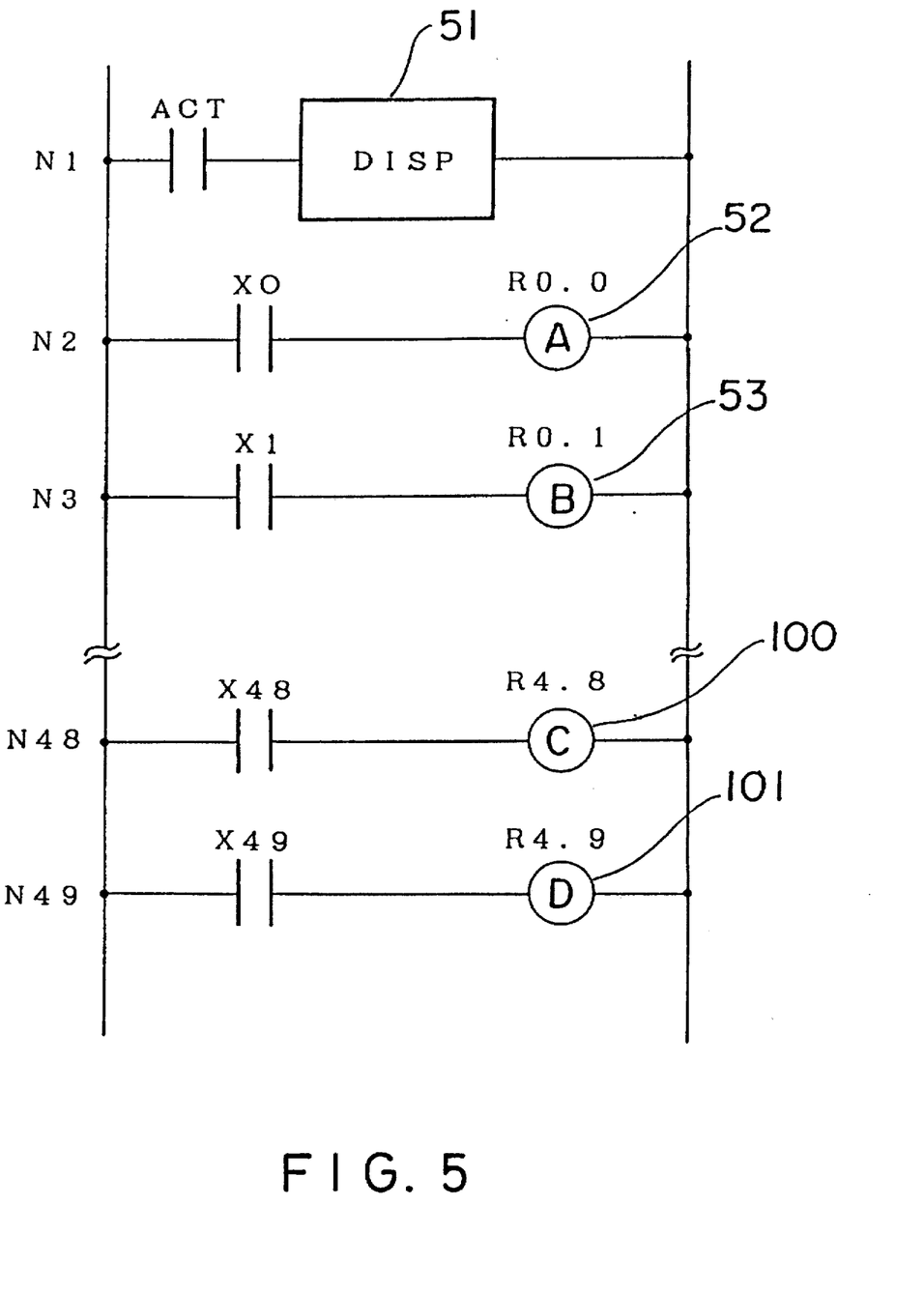
FIG. 5 is a diagram showing an example of a ladder program.

Next, a sequence program for actually instructing the display of a message will be described. FIG. 5 is a diagram showing an example of a ladder program of this embodiment. A net N1 includes a message display command (DISP) 51 as a function command. When a contact ACT is turned ON, the DISP 51 is executed. Nets N2–N49 include contacts X0–X49 and coils 52–101, respectively. Further, the respective addresses R0.0–R4.9 correspond to the respective message numbers 5000–5049 of the message area 50 for a single language in FIG. 4, respectively, on the basis of one to one.

When any one of the coils 52–101 is turned ON while the ladder program is executed, the DISP 51 displays the message at the message number corresponding to the coil on the display screen of the display unit 31. For example, when the contact X0 is turned ON and thus the coil 52 is turned ON, the message at the message number 5000 corresponding to the address R0.0 of the coil 52, i.e., "MACHIGAI" in Japanese will be displayed on the display screen. In the same way, when the coil of other net is turned ON, a message corresponding to the coil will be displayed.

As described above, according to this embodiment, when a power is supplied, only a message of a specific language is transferred from the message area 40 for a plurality of languages to the message area 50 for a single language and the message corresponding to the address of a turned ON coil is displayed. As a result, a message can be displayed by a plurality of languages only by programming the coils 52–101 corresponding to the messages of a single language. Therefore, a programming job is simplified and the sequence program can be effectively processed when the PMC 20 is in operation.

Figure 6:
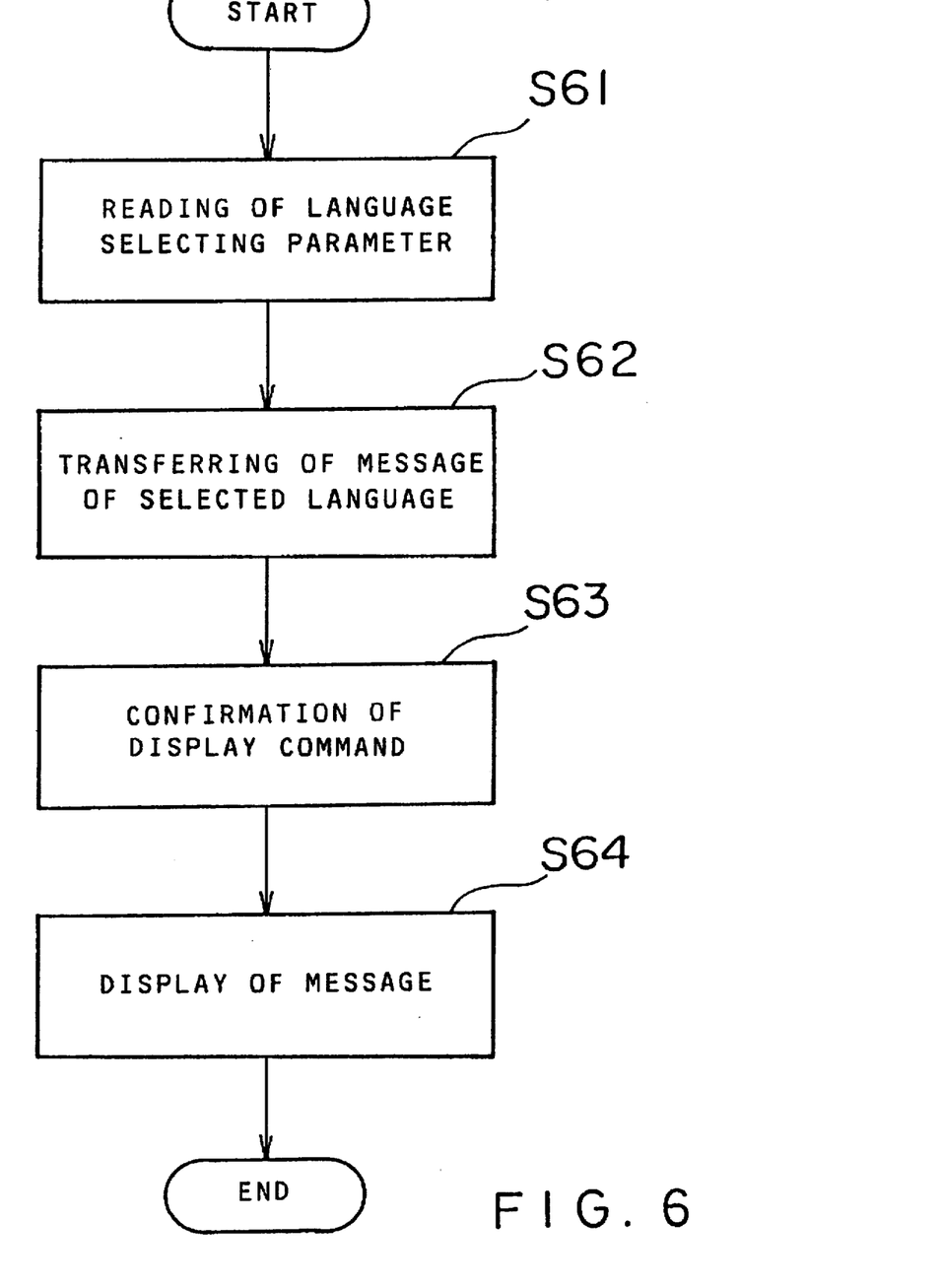
FIG. 6 is a flowchart showing a procedure for executing an embodiment according to the present invention.

FIG. 6 is a flowchart showing a procedure performed by the processor 21 to execute this embodiment. Note, this flowchart is executed from the time when a power is supplied to the PMC 20.

[S61] The language selection parameter is read.

[S62] Message data of a selected language is transferred from the message area 40 for a plurality of languages to the message area 50 for a single language and stored therein.

[S63] The address of the coil turned ON by the execution of the DISP 51 is confirmed.

[S64] The message at the message number corresponding to the address of the turned ON coil is displayed on the display screen of the display unit 31 from the message area 50 for a single language.

Figure 7:
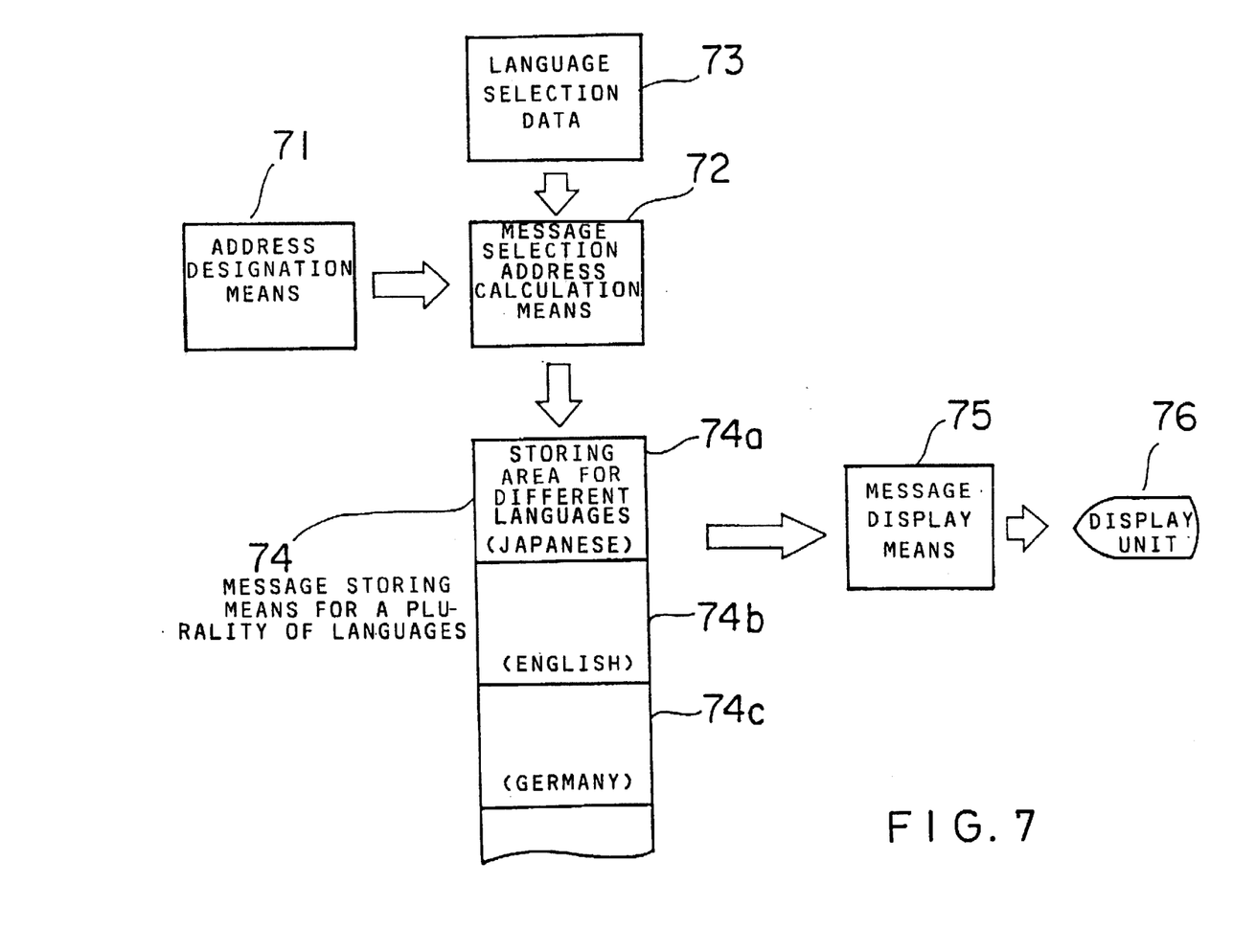
FIG. 7 is another conceptual diagram according to the present invention.

Next, another embodiment of the present invention will be described. FIG. 7 shows another conceptual diagram of the present invention. An address designation means 71 designates a message desired to be displayed on the display screen while the PC is in operation by an address determined to correspond to the meaning of each message. A message selection address calculation means 72 executes an offset calculation based on the numerical value of the address designated by the address designation means 71 and the numerical value preinput by the language selection data 73 and determines a message selection address. A message storing means 74 for a plurality of languages includes message storing areas 74a–74b for the plurality of languages in which messages having the same meaning in the different languages are stored at addresses having a sequence corresponding to one another. A message display means 75 fetches a message corresponding to the message selection address determined by the message selection address calculation means 72 from the message storing means 74 for a plurality of languages and displays the same on the display screen of a display unit 76.

Next, a specific example of this embodiment will be described. A hardware used here has the same arrangement as that shown in FIG. 2. Further, it is assumed that the message area 40 for a plurality of languages shown in FIG. 3 is stored in a ROM 22. Further, the ladder program shown in FIG. 5 is used as a sequence program for displaying a message. In this embodiment, an offset coefficient α is given to each of the message areas 41–44 of the message area 40 for a plurality of languages. As the offset coefficient α, 1000 is given to the Japanese message area 41, 1050 is given to the English message area 42, 1100 is given to the German message area 43, and 1150 is given to the French message area 44. When the ladder program is created or renewed, only the offset coefficients α corresponding to the languages selected by an operator are contained in a DISP 51.

When the DISP 51 is executed, an offset coefficient α is read in, and then the address (R) of a turned ON coil is read out. When the offset coefficient α and address R are read in, the number of a message to be displayed is calculated by the following equation (1).

$$\text{message number} = \alpha + R \times 10 \tag{1}$$

Therefore, when the offset coefficient α is to 1050 (English) and a coil 52 (R0.0) is turned ON, a message number 1050 is calculated by the equation (1). When the message number is calculated as described above, the message corresponding to the message number is fetched from the message area 40 for a plurality of languages and displayed on the display screen of the display unit 31. More specifically, the message "ERROR" corresponding to the message number 1050 is displayed here.

Figure 8:
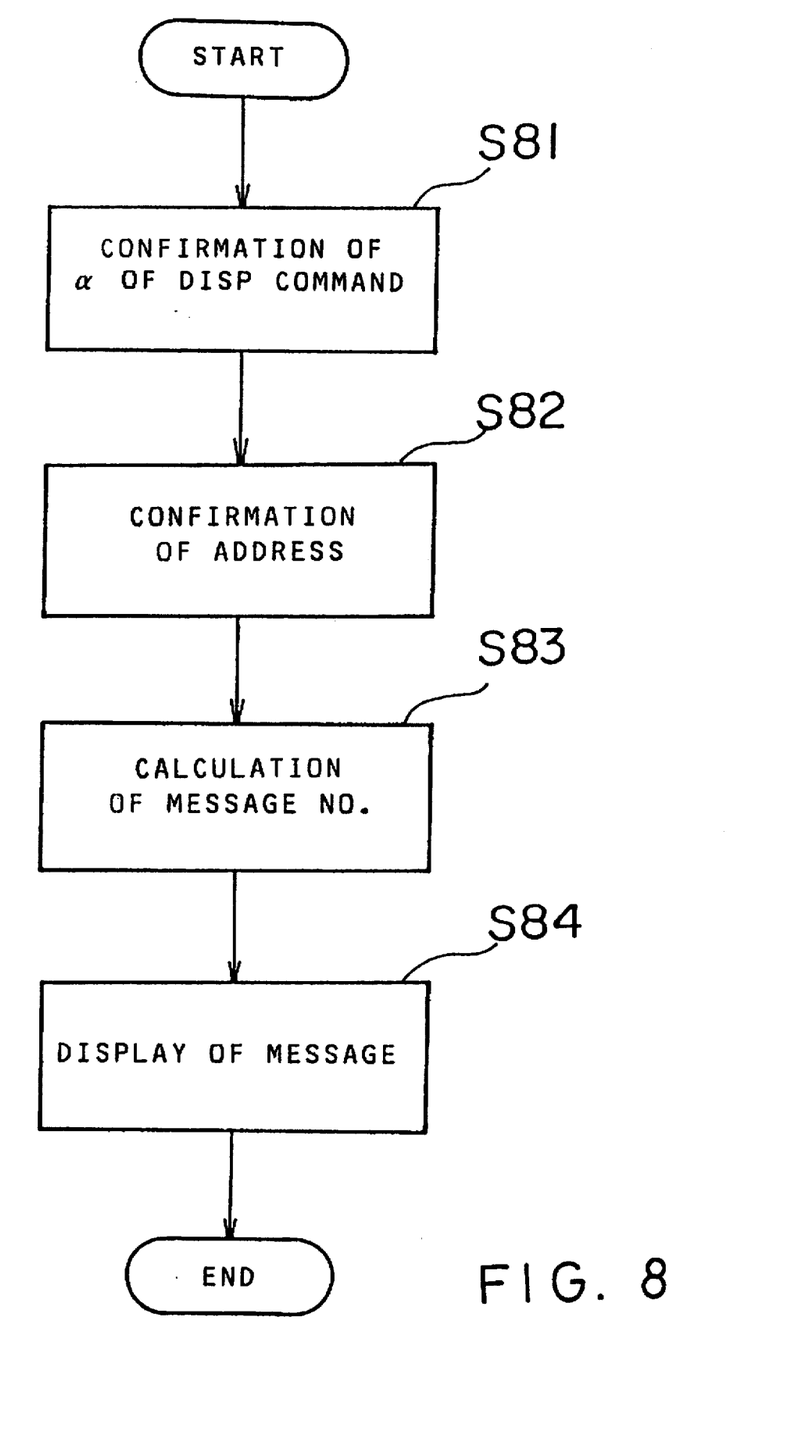
FIG. 8 is a flowchart showing a procedure for executing another embodiment according to the present invention.

FIG. 8 is a flowchart showing a procedure performed by a processor 21 to execute this embodiment. Note, this flowchart is executed from the time when a power is supplied to a PMC 20.

[S81] The offset coefficient α in the DISP 51 is confirmed.
[S82] The address R of a turned ON coil is confirmed.
[S83] A message number is calculated by the equation (1).
[S84] The message corresponding to the calculated message number is fetched from the message area 40 for a plurality of languages and displayed on the display screen.

As described above, according to this embodiment, since a message stored in the message area 40 for a plurality of languages is directly fetched and displayed, the sequence program can be more effectively processed.

Note, although the offset coefficients α are included in the DISP 51 in this embodiment, they may be set by parameters.

Further, although the message numbers are given in correspondence to the respective messages in the above two embodiments, all the messages having the same meanings may be stored in the same memory address (e.g., bank memory) in place of the above arrangement. In this case, when a message is to be displayed, only the message of a language previously designated by a parameter is selected and displayed. With this arrangement, the number of coils on the sequence program can be reduced in the same way as the above two embodiments. In addition, since the total number of addresses to be handled can be minimized, a job for storing messages to a memory can be easily carried out.

As described above, according to the present invention, since a message of a single language previously designated by a parameter is transferred from the message storing means for a plurality of languages to the message storing means for a single message when a power is supplied, the address of a message desired to be displayed while the PC is in operation is designated, and the message of the designated address is fetched from the message storing means for a single language and displayed on the display screen, the message can be displayed in a plurality of languages only by programming the coils as many as the messages corresponding to a single language. Therefore, a programming job is simplified as well as the sequence program can be more effectively processed while the PC is in operation.

We claim:

1. A message display apparatus for a programmable controller (PC) for displaying a message on a display screen while the PC is in operation, comprising:

first message storing means for storing a plurality of different languages in a plurality of respective language storing areas, each of said language storing areas storing a plurality of messages in a language different from that of the other said language storing areas, said messages having the same meaning in the different languages being stored at addresses having a sequence corresponding to one another;

second message storing means for storing a single language of said plurality of different languages to which only messages of said single language are transferred from said first message storing means and are stored at addresses having a sequence corresponding to the messages stored in a respective said language storing area of said first message storing means;

message transfer means for transferring said messages of the single language based on a preset parameter, from said first message storing means to said second message storing means when power is supplied to said PC;

message selection means for designating a message desired to be displayed on said display screen while said PC is in operation by an address determined to correspond to the meaning of said desired message in the second message storing means; and message display means for fetching the desired message at said address determined by said message selection means from said second message storing means and displaying said fetched message on said display screen.

2. A message display apparatus for a programmable controller (PC) for displaying a message on a display screen while the PC is in operation, comprising:

message storing means for storing a plurality of languages in a plurality of respective language storing areas, each of said language storing areas storing a plurality of messages in a language different from that of the other said language storing areas, said messages having the same meaning in the different languages being stored at addresses having a sequence corresponding to one another;

address designation means for designating one of said messages desired to be displayed on said display screen while said PC is in operation by an address determined to correspond to the meaning of said desired message;

message selection address calculation means for executing an offset calculation based on a numerical value of said address determined by said address designation means and a preinput numerical value of language selection data, to determine a message selection address; and message display means for fetching said desired message corresponding to said determined message selection address from said message storing means and displaying said fetched message on said display screen.

3. A message display apparatus for a PC according to claim 2, wherein said language selection data is included in a display command in a sequence program.

4. A message display apparatus for a PC according to claim 2, wherein said language selection data is input by a parameter.

* * * * *

UNITED STATES PATENT AND TRADEMARK OFFICE
CERTIFICATE OF CORRECTION

PATENT NO. : 5,659,337

DATED : August 19, 1997

INVENTOR(S) : Kunio TANAKA, et al.

Page 1 of 2

It is certified that error appears in the above-identified patent and that said Letters Patent is hereby corrected as shown below:

TITLE PAGE [57] ABSTRACT

Line 5, delete "(1a-1c)".

Line 7, delete "(1a-1c)".

Line 10, delete "(3)".

Line 12, delete "(2)", and delete "(1)".

Line 13, delete "(4)".

Line 14, delete "(5)".

Line 18, delete "(6)".

Line 19, delete "(4)".

Line 21, delete "(7)".

UNITED STATES PATENT AND TRADEMARK OFFICE
CERTIFICATE OF CORRECTION

PATENT NO. : 5,659,337
DATED : August 19, 1997
INVENTOR(S) : Kunio TANAKA, et al.

It is certified that error appears in the above-identified patent and that said Letters Patent is hereby corrected as shown below:

Column 1 line 53, 2nd occurr."a" should be --$\underline{a}$--.

line 55, 1st occurr."a" should be --$\underline{a}$--; and "b" should be --$\underline{b}$--.

Line 58, "Not" should be "More".

Column 5 lines 5 & 6   change "RAN" to --RAM--.

Signed and Sealed this

Twenty-third Day of December, 1997

Attest:

BRUCE LEHMAN

Attesting Officer    Commissioner of Patents and Trademarks